United States Patent
Borner

[15] 3,704,901
[45] Dec. 5, 1972

[54] PIPE JOINT CONNECTOR

[72] Inventor: Fritz Borner, Kelsterbach, Germany

[73] Assignee: Messer Griesheim GmbH, Frankfurt/Main, Germany

[22] Filed: Feb. 16, 1971

[21] Appl. No.: 115,418

[30] Foreign Application Priority Data

March 4, 1970 Germany ............P 20 10 013.4

[52] U.S. Cl. ..................285/173, 285/286, 285/381
[51] Int. Cl. ...........................................F16l 13/02
[58] Field of Search .285/173, 286, 381, 187, DIG. 5, 285/DIG. 6

[56] References Cited

UNITED STATES PATENTS

| | | | |
|---|---|---|---|
| 3,163,449 | 12/1964 | Westfall | 285/286 X |
| 2,878,040 | 3/1959 | Hobbs | 285/286 |
| 2,695,184 | 11/1954 | Hobbs | 285/187 X |
| 3,287,034 | 11/1966 | Bragg | 285/381 X |
| 3,322,143 | 5/1967 | Buschow | 285/173 X |

Primary Examiner—Thomas F. Callaghan
Attorney—Connolly and Hutz

[57] ABSTRACT

Pipes of varying material are connected together by a connection wherein a ring on one pipe extends beyond a collar on the other pipe with a slot created between the ring and the other pipe. An intermediate ring, preferably of the same or similar material as the outer ring, is slipped into the slot.

8 Claims, 1 Drawing Figure

PATENTED DEC 5 1972 3,704,901
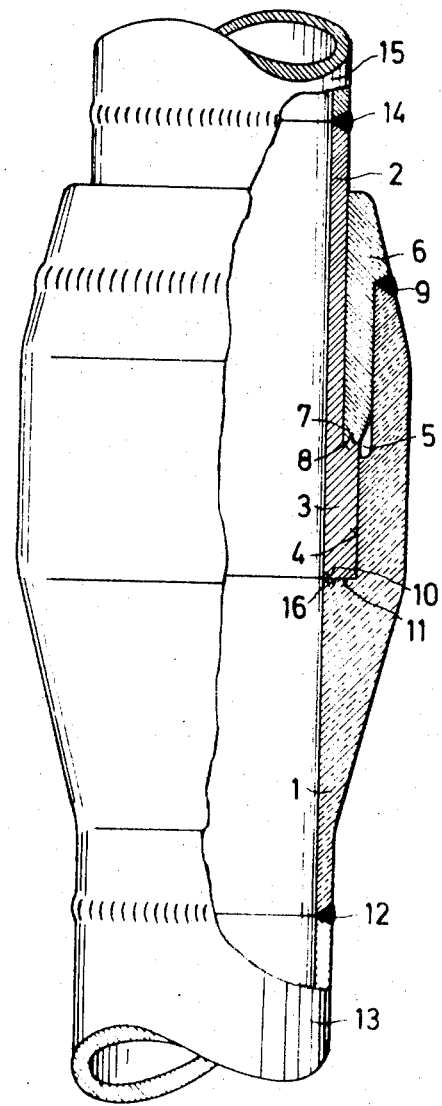

PIPE JOINT CONNECTOR

BACKGROUND OF INVENTION

This invention relates to a pipe joint connector, particularly for pipes consisting of varying material, with a collar-like necked first pipe and a ring fitted to the diameter of the collar.

In pipe conduits, wherein liquid gases are conveyed at very low temperatures, pipe joint connectors of the usual type may not be employed. The manufacture of such pipe joint connectors is particularly difficult when the pipes consist of different types of materials, such as aluminum and copper or aluminum and austenitic steel for example.

It is known to connect such pipes by means of welding. It is disadvantageous that at such transition of the welding seam, there is formed an intermetallic area which tends to break at low temperatures (up to 200°C) and/or during mechanical stress.

A pipe joint connection is known for pipes with a nearly the same inside diameter, with an outside collar-like necked inside pipe and an outer pipe section fitted to the outside diameter of the collar (French Pat. No. 1,326,108) wherein a sleeve, which is fitted to the collar, is soldered to the outer pipe section. For sealing, there are soldered together the end part of the sleeve and the inner pipe; this joint breaks easily at low temperatures.

In another known pipe joint connection (U.S. Pat. No. 2,878,040) the outside pipe extends past the inside pipe and both pipe sections are welded together. A jacket is then additionally welded with the outer pipe section. It is disadvantageous that in pipes consisting of varying materials, the welding joint tends to break, particularly at low temperatures. Furthermore, the inside welding between the pipe sections is difficult to produce and to check.

SUMMARY OF INVENTION

The object of this invention is to provide a pressure shrinking pipe joint connection which remains sealed in wide temperature ranges.

This problem is solved according to the invention in that the ring extends past the collar and that an intermediate ring may be slipped in, in the slot between the first pipe and the ring, and that the intermediate ring and the outer ring consist preferably of the same or similar material. Suitably, the outer ring and the intermediate ring are welded together.

In a suitable embodiment of the invention, the intermediate ring and the ring are welded together. The pipe joint connection tolerates operating temperatures from +200° to −200°C and operating pressures of over 200 kp/cm$^2$ without the occurrence of tears at the connecting points. No seals are needed at the connecting points.

Furthermore, it is advantageous according to the invention that a frontal surface of the intermediate ring lies against a frontal surface of the collar in a sealing manner.

In an advantageous embodiment of the invention, the ring has a different diameter than the diameter of the collar in the area of the slot. Thereby results a large slot surface for the intermediate ring, which strength-wise may be executed more advantageously.

In a still further advantageous embodiment of the invention, there are provided at the frontal surfaces of the collar ring-shaped sealing ridges which may be pressed in into the ring and/or into the intermediate ring. In varying effective substances, the sealing ridges are driven into the softer material.

THE DRAWING

The FIGURE shows a partial sectional view of the novel pipe joint connection in accordance with this invention.

DETAILED DESCRIPTION

The pipe joint connection consists of a ring 1 and a pipe 2 with a collar 3. Ring 1 has a recess 4 which is fitted to collar 3 by for example a shrink fit. Ring 1 extends past collar 3 and is spaced from pipe 2 to create a slot 5. In slot 5 between the outside surface of pipe 2 and the inside surface of the protruding part of ring 1, there is slipped on an intermediate ring 6 whose frontal surface 7 abuts frontal surface 8 of collar 3. The intermediate ring 6 and outer ring 1 may be connected by means of an adhering welding seam 9. In the illustrated exemplary embodiment, ring 1 consists of aluminum, for example, and pipe 2 of austenitic steel, such as V2a steel. At frontal surfaces 8 and 10 of collar 3 there are provided ring-shaped sealing prongs 11 which are pressed into the soft material of ring 1 for additionally sealing the connection. Pipe 2 is connected by means of welding seam 14 with pipe 15 consisting of similar material.

Intermediate ring 6 may also consist of segments or half shells (not shown). In such an embodiment, there are preferably also provided sealing prongs or a labyrinth-like profiling of the abutting end at the axial abutting ends of the segments or half shells.

The finishing procedure for the novel pipe joint connector is as follows:

The prefinished ring 1 of aluminum is heated to about 300°C. Then the non-heated pipe 2 is pushed into ring 1 and with pressure pressed against the frontal surface 16 of ring 1, so that the sealing prongs 11 penetrate into the frontal surface 16. Once this work process is completed, the non-heated intermediate ring 6 is pushed into slot 5 and with pressure pressed against the frontal surface 8 of collar 3, so that sealing prongs 11 penetrate into the frontal surface 7 of intermediate ring 6.

Upon cooling of ring 1, there result through contraction great adhering forces and thereby a firm connection between outer ring 1, intermediate ring 6 and pipe 2.

After the cooling, ring 1 and the intermediate ring 6 are additionally connected together by an adhering welding seam 9, and there results an insoluble transition connection.

The novel pipe joint connector is particularly advantageous with respect to pipe conduits wherein liquid gases are conveyed (e.g. in gas and air separation plants) at very low temperatures (−200°C), since the adhering forces existing at room temperature (20°C) are intensified due to the low temperature (−200°C).

What is claimed is:

1. A pipe joint connector adapted for connecting pipes made of different materials wherein the end of the first pipe has an enlarged collar formed thereon, the end of the second pipe being widened outward to form a jacket, which is connected to the collar by a press fit; characterized in that said jacket extending longitudinally beyond said collar and being spaced from said first pipe to form an annular slot therebetween, an intermediate ring being inserted in said slot and fixed to said jacket, said ring being in abutting engagement with said collar, said collar having a frontal surface, said jacket having an internal ring shaped area juxtaposed said frontal surface, and sealing prongs connecting said frontal surface to said ring shaped area.

2. The pipe joint connector of claim 1 wherein the end of said jacket and said intermediate ring are welded together.

3. The pipe joint connector of claim 2 wherein the inside diameter of said jacket is greater in the area of said slot than in the area of said collar.

4. The pipe joint connector of claim 3 wherein said collar has a rear surface juxtaposed the end of said intermediate ring, and sealing prongs connecting said rear surface to the end of said intermediate ring.

5. The pipe joint connector of claim 1 wherein the inside diameter of said jacket is greater in the area of said slot than in the area of said collar.

6. The pipe joint connector of claim 5 wherein said collar has a rear surface juxtaposed the end of said intermediate ring, and sealing prongs connecting said rear surface to the end of said intermediate ring.

7. The pipe joint connector of claim 2 wherein said collar has a rear surface juxtaposed the end of said intermediate ring, and sealing prongs connecting said rear surface to the end of said intermediate ring.

8. The pipe joint connector of claim 1 wherein said collar has a rear surface juxtaposed the end of said intermediate ring, and sealing prongs connecting said rear surface to the end of said intermediate ring.

* * * * *